United States Patent
Pan et al.

(10) Patent No.: US 12,261,729 B1
(45) Date of Patent: Mar. 25, 2025

(54) SIGNAL PROCESSING IN WIRELESS COMMUNICATION

(71) Applicant: TP-Link Systems Inc., Irvine, CA (US)

(72) Inventors: Weifeng Pan, Shenzhen (CN); Yaoqiang Wang, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/915,013

(22) Filed: Oct. 14, 2024

(51) Int. Cl.
*H04B 1/00* (2006.01)
*H04L 27/26* (2006.01)

(52) U.S. Cl.
CPC .................. *H04L 27/2623* (2013.01)

(58) Field of Classification Search
CPC .................................. H04L 27/2623
USPC ............................. 455/63.1, 67.13
See application file for complete search history.

(56) References Cited

U.S. PATENT DOCUMENTS

| | | | | |
|---|---|---|---|---|
| 6,034,378 A * | 3/2000 | Shiraishi | ........... | G03F 9/7049 250/237 G |
| 6,252,719 B1 * | 6/2001 | Eichenbaum | ....... | H04J 14/0305 398/9 |
| 7,668,343 B2 * | 2/2010 | Kobayashi | ........... | G03F 9/7011 356/396 |
| 8,928,882 B2 * | 1/2015 | Imaoka | ........... | G03F 9/7015 356/616 |
| 10,151,987 B2 * | 12/2018 | Deckers | ........... | G03F 9/7076 |
| 10,598,483 B2 * | 3/2020 | Tarabrin | ........... | G03F 7/70633 |
| 11,526,091 B2 * | 12/2022 | Elazhary | ........... | G03F 9/7088 |
| 11,531,280 B2 * | 12/2022 | Elazhary | ........... | G03F 9/7049 |
| 12,009,006 B2 * | 6/2024 | Chen | ........... | H04R 3/005 |
| 2013/0315320 A1 * | 11/2013 | McGowan | ........... | H04L 27/2655 375/260 |
| 2015/0065813 A1 * | 3/2015 | Wochlik | ........... | A61B 5/7207 600/559 |
| 2017/0097574 A1 * | 4/2017 | Goodwin | ........... | G01J 1/0448 |

FOREIGN PATENT DOCUMENTS

| | | |
|---|---|---|
| CN | 101316251 A | 12/2008 |
| CN | 101072057 B | 4/2012 |
| CN | 109948223 B | 3/2021 |
| CN | 114500211 A | 5/2022 |
| CN | 117395108 A | 1/2024 |
| WO | 2009056044 A1 | 5/2009 |

* cited by examiner

*Primary Examiner* — Marceau Milord

(74) *Attorney, Agent, or Firm* — Loeb & Loeb LLP

(57) ABSTRACT

This disclosure provides a method and an apparatus for processing signals in wireless communication. The method includes: determining peak points respectively corresponding to first sampling points of an input signal, which are to be peak-reduced; generating a peak reduction value sequence with peak reduction values based on amplitudes of the peak points; generating a peak reduction signal by performing peak shaping on the peak reduction value sequence based on position displacing of the peak points from the first sampling points; and generating an output signal by subtracting the peak reduction signal from the input signal.

20 Claims, 5 Drawing Sheets

SIGNAL PROCESSING IN WIRELESS COMMUNICATION

TECHNICAL FIELD

The present disclosure relates to wireless communication, and more specifically, to method and apparatus for processing signals in wireless communication.

BACKGROUND

OFDM (Orthogonal Frequency Division Multiplexing) technology is a common high-speed data transmission technology in wireless communication, which has been widely used in WIFI and 4/5G communication. This technology usually uses the orthogonality of subcarriers to improve utilization ratio of frequency domain resources, but when multiple subcarriers are accumulated in the same phase in the time domain, large peaks will occur, resulting in a higher peak-to-average power ratio (PAPR). Peak-to-average ratio is an important performance metric used to measure the dynamic range of the system in the transmission process and reflect the difference between the peak power and the average power of OFDM signal. At a transmitter of wireless communication system, since the OFDM signal with peak-to-average ratio has larger peak power, PA (Power Amplifier) needs to have a larger linear area to ensure accurate transmission and non-distortion of the signal. Otherwise, the signal will be distorted when entering the nonlinear area of PA, resulting in intermodulation interference between carriers and out-of-band leakage, which will lead to nonlinear distortion of the signal and degrade the system performance. In practical systems, the linear area of PA and other analog devices is always limited. Thus, the amplitude of the OFDM signal may need to be restricted to reduce the PAPR of the signal.

SUMMARY

In view of this, the present disclosure provides a method and apparatus for processing signals in wireless communication.

In an aspect of the present disclosure, the present disclosure provides a method for processing signals in wireless communication, the method comprising: determining peak points respectively corresponding to first sampling points of an input signal, which are to be peak-reduced; generating a peak reduction value sequence with peak reduction values based on amplitudes of the peak points; generating a peak reduction signal by performing peak shaping on the peak reduction value sequence based on position displacing of the peak points from the first sampling points; and generating an output signal by subtracting the peak reduction signal from the input signal.

In another aspect of the present disclosure, the present disclosure provides an apparatus for processing signals in wireless communication, the apparatus comprising: one or more processors; a memory coupled to at least one of the processors; and a set of computer program instructions stored in the memory, which, when executed by at least one of the processors, perform actions of: determining peak points respectively corresponding to first sampling points of an input signal, which are to be peak-reduced; generating a peak reduction value sequence with peak reduction values based on amplitudes of the peak points; generating a peak reduction signal by performing peak shaping on the peak reduction value sequence based on position displacing of the peak points from the first sampling points; and generating an output signal by subtracting the peak reduction signal from the input signal.

In yet another aspect of the present disclosure, the present disclosure provides an apparatus for processing signals in wireless communication comprising means for determining peak points respectively corresponding to first sampling points of an input signal, which are to be peak-reduced; means for generating a peak reduction value sequence with peak reduction values based on amplitudes of the peak points; means for generating a peak reduction signal by performing peak shaping on the peak reduction value sequence based on position displacing of the peak points from the first sampling points; and means for generating an output signal by subtracting the peak reduction signal from the input signal.

In yet another aspect of the present disclosure, the present disclosure provides a non-transitory computer-readable storage medium storing instructions that cause a processor to: determine peak points respectively corresponding to first sampling points of an input signal, which are to be peak-reduced; generate a peak reduction value sequence with peak reduction values based on amplitudes of the peak points; generate a peak reduction signal by performing peak shaping on the peak reduction value sequence based on position displacing of the peak points from the first sampling points; and generate an output signal by subtracting the peak reduction signal from the input signal.

In yet another aspect of the present disclosure, the present disclosure provides a computer program product comprising program instructions, wherein the program instructions, when executed by a processor, cause the processor to: determine peak points respectively corresponding to first sampling points of an input signal, which are to be peak-reduced; generate a peak reduction value sequence with peak reduction values based on amplitudes of the peak points; generate a peak reduction signal by performing peak shaping on the peak reduction value sequence based on position displacing of the peak points from the first sampling points; and generate an output signal by subtracting the peak reduction signal from the input signal.

According to embodiments of the present disclosure, the peak reduction signal can be generated with filtering based on position displacing of the peak points from the first sampling points, which can reduce damages to the signal caused by peak clipping.

BRIEF DESCRIPTION OF DRAWINGS

The above and other aspects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

Figure 1:
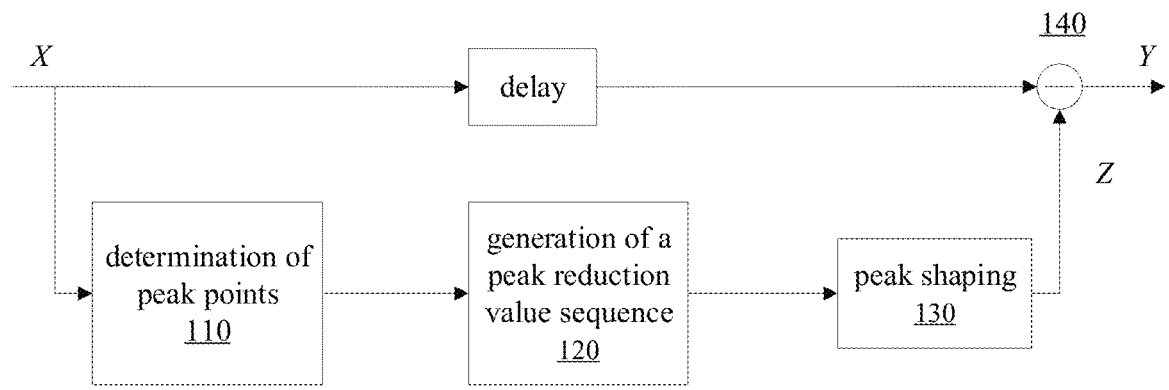
FIG. 1 shows an exemplary logical block diagram for processing signals in wireless communication according to an embodiment of the present disclosure.

The technical solution of the present disclosure may be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but can comprise electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined with each other as long as no conflicts occurs therebetween.

As described in the above, the amplitude of an OFDM signal may need to be restricted to reduce the PAPR of the signal. Some techniques may be adopted to reduce PAPR, for example, a clipping technique. The clipping technique may include for example a peak clipping method. A kind of peak clipping method is CFR (Creset Factor Reduction). A conventional CFR usually apply a fixed filter to generate a peak reduction signal to be subtracted from the OFDM signal, which may cause large damages to the signal. For example, the conventional CFR may lead to excessive suppression of high frequency signals, thereby weakening the instantaneous characteristics of signals. In view of this, embodiments of the present disclosure propose an improved way of peak clipping (for example, an improved CFR), the peak reduction signal can be generated with filtering based on position displacing of the peak points from corresponding sampling points of the OFDM signal, which can reduce damages to the signal caused by peak clipping. Please note that embodiments of the present disclosure are not limited to OFDM signals but applicable to any signals needing peak clipping.

FIG. 1 shows an exemplary logical block diagram for processing signals in wireless communication according to an embodiment of the present disclosure.

According to an embodiment of the present disclosure, an input signal $X=[x_0, x_1, \ldots, x_n]$ can be received, wherein $x_0, x_1, \ldots, x_n$ are signal values of the second sampling points of the input signal with a sampling rate. The sampling rate may also be referred to a first sampling rate herein to be distinguished from the other sampling rate (referred to as a second sampling rate herein). The first sampling rate can be any sampling rate that meets performance requirements and is not limited herein. Each of $x_0, x_1, \ldots,$ and $x_n$ can be referred to as $x_i$, wherein $i=0, 1, \ldots, n$, and $x_i$ is the signal value of sampling point #i of the second sampling points. The input signal may be for example an OFDM signal. The input signal can include amplitudes $[mag_0, mag_1, \ldots, mag_n]$ and phases $[phase_0, phase_1, \ldots, phase_n]$. For example, the amplitudes and phases may be calculated through complex conjugate operation and angle calculation. For example, the input signal can be a complex signal expressed as $x=a+j\cdot b$, where "a" is the real part of the complex signal and "b" is the imaginary part of the complex signal, and j is an imaginary symbol. Therefore, the amplitudes can be calculated as $r=\sqrt{a^2+b^2}$ and the phase value can be calculated as: $\theta=\tan^{-1}(b/a)$.

At 110, peak points respectively corresponding to first sampling points of the input signal $X=[x_0, x_1, \ldots, x_n]$, which are to be peak-reduced, can be determined. The first sampling points may be sampling points related to (for example, closest to) the peak point among the second sampling points obtained by sampling the input signal with the first sampling rate. Some examples of determination of peak points will be described below.

Figure 2:
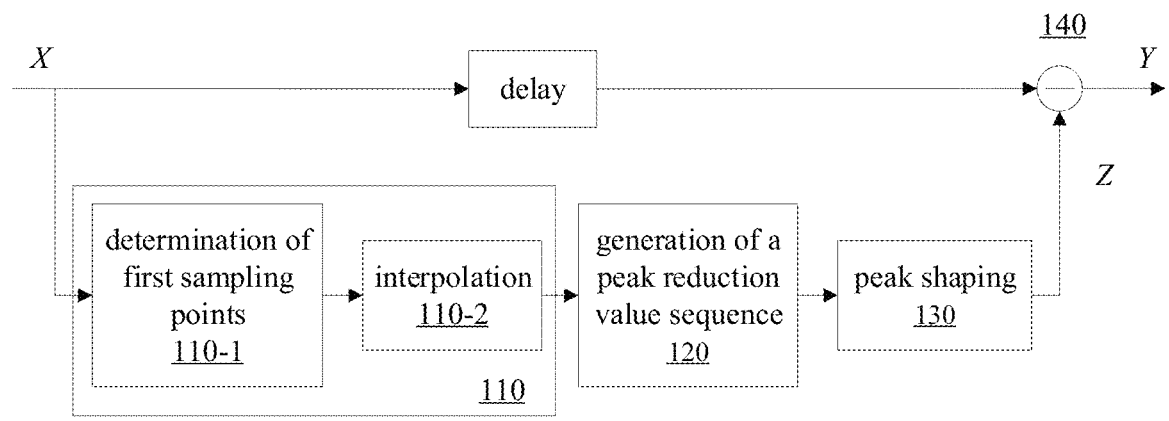
FIG. 2 shows another exemplary logical block diagram for processing signals in wireless communication according to an embodiment of the present disclosure.
Figure 3:
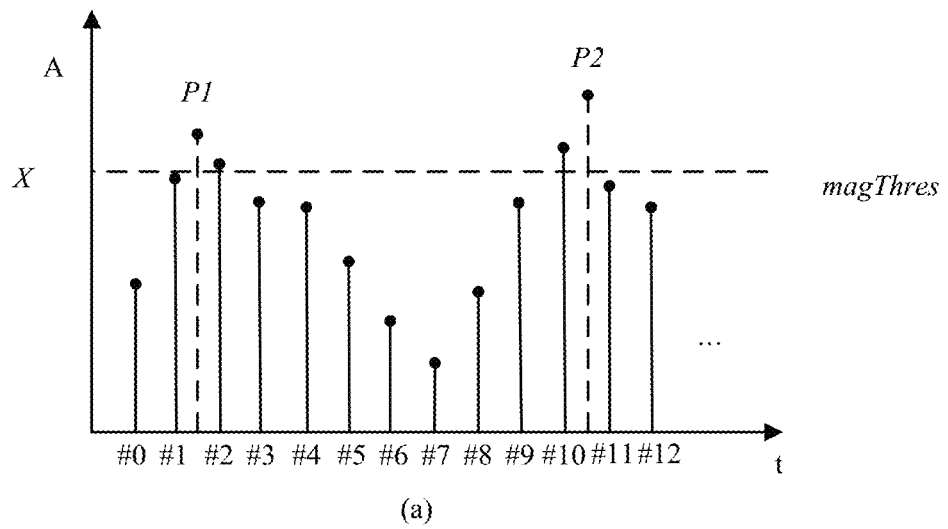
FIG. 3 shows exemplary diagrams of a process of generating a peak reduction signal according to an embodiment of the present disclosure.
Figure 3:
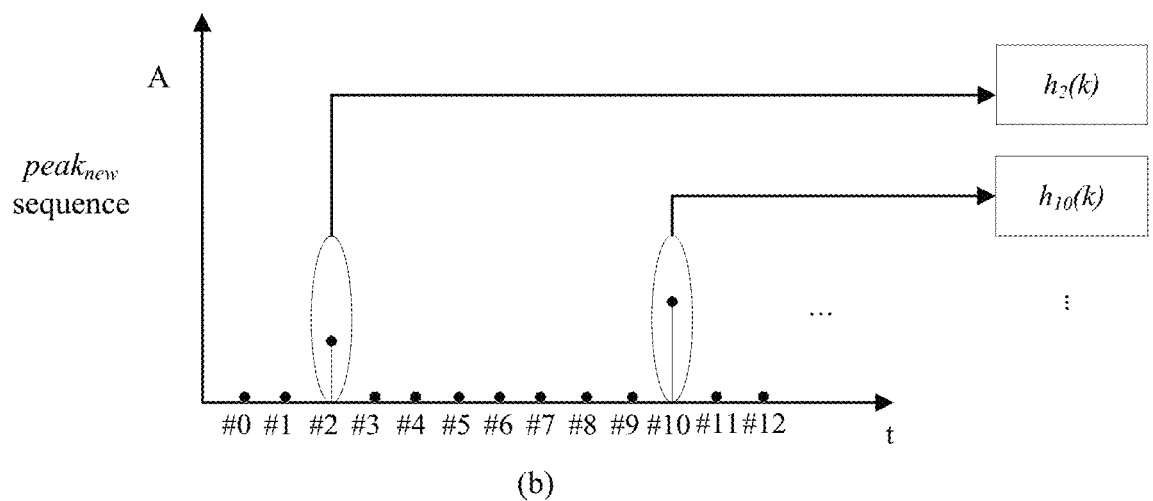
Figure 3:
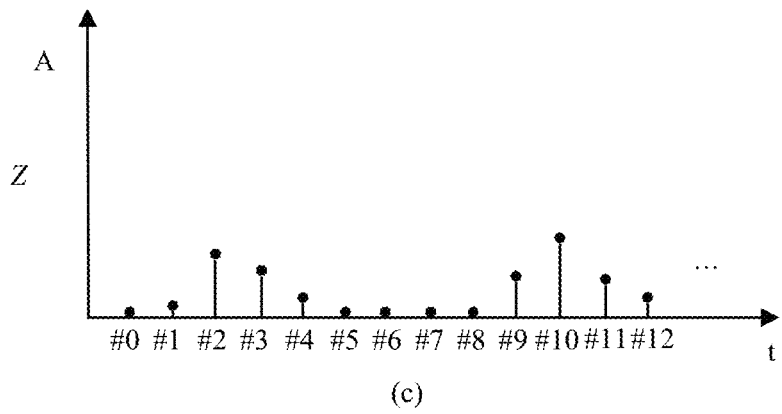

According to an embodiment of the present disclosure, the peak points (for example, points marked as "P1" or "P2" as shown in (a) of FIG. 3) of the input signal respectively corresponding to the first sampling points (such as sampling points #2 and #10 as shown in (a) of FIG. 3) can be determined by interpolation based on the first sampling points. In this case, process 110 may include processes 110-1 and 110-2 as shown in FIG. 2.

As shown in FIG. 2, at 110-1, the first sampling points of the input signal $X=[x_0, x_1, \ldots, x_n]$ can be determined. For example, the input signal is sampled with the first sampling rate to obtain the second sampling points of the input signal, such as sampling points #0, #1, #2, #3, #4, #5, #6, #7, #8, #9, #10, #11 and #12. The first sampling points refer to sampling points to be processed (that is, the sampling points whose amplitudes need to be restricted) among the second sampling points of the input signal.

For example, the first sampling points can be determined by comparing amplitudes of the second sampling points of the input signal with a preset threshold. The preset threshold may also be referred to a first preset threshold herein to be distinguished from the other preset threshold (referred to as a second preset threshold herein).

In an embodiment, the sampling points whose amplitudes are larger than the first preset threshold among the second sampling points can be determined as the first sampling points. As shown in (a) of FIG. 3, the sampling points with the maximum amplitudes larger than the first preset threshold magThres among the second sampling points can be determined as the first sampling points, such as sampling points #2 and #10.

In another embodiment of the present disclosure, only the amplitudes of part of the second sampling points of the input signal can be compared with the first preset threshold magThres. For example, a search window with a present length winLen, which can also be called a peak search window, can be moved along the input signal to determine the first sampling points. The search window may also be referred to a first search window herein to be distinguished from the other search window (referred to as a second search window herein). The present length may also be referred to a first present length herein to be distinguished from the other present length (referred to as a second present length herein). A maximum amplitude (for example, $mag_w$) of the second sampling points within the first search window can determined each time the first search window is moved. Then, the maximum amplitude (for example, $mag_w$) within the first search window can be compared with the threshold magThres such that the sampling point with the maximum amplitude among the second sampling points is determined as one of the first sampling points in response to the maximum amplitude being greater than the first preset threshold. The first search window can be moved along the input signal until all the second sampling points the input signal are covered.

As mentioned above, the threshold magThres can be preset. The setting of the threshold magThres may be associated with the peak clipping effect. For example, the threshold magThres can be calculated according to the following formula (1).

$$magThres = \sqrt{P * 10^{\frac{N}{10}}} \quad (1)$$

where P is current power of the input signal and N is a target PAPR value. According to an embodiment of the present disclosure, by setting the threshold magThres according to the target PAPR value, the first sampling points can be determined more flexibly and accurately. It can be understood that the threshold magThres can also be set in other ways.

At 110-2, peak points (for example, points marked as "P1" or "P2" as shown in (a) of FIG. 3) of the input signal respectively corresponding to the first sampling points (such as sampling points #2 and #10 as shown in (a) of FIG. 3) determined at 110-1 can be determined by interpolation based on the first sampling points. The interpolation can use various interpolation methods, such as Lagrange interpolation function, linear interpolation, nonlinear interpolation or Newton interpolation.

In order to determine peak points of the input signal, for each of the first sampling points to be processed, an amplitude distribution can be determined based on a predetermined interpolation function and amplitudes of said each of the first sampling point and a predetermined number of sampling points among the second sampling points around said each of the first sampling points. Then, an amplitude and a position of a peak point for each of the first sampling points can be determined according to the amplitude distribution. For example, the amplitudes and positions of the peak points can be represented by coordinates of the peak points. The horizontal coordinates can represent positions of the peak points and the vertical coordinates can represent amplitudes of the peak points.

According to an embodiment of the present disclosure, the predetermined number of sampling points among the second sampling points around each of the first sampling points can be 2. For example, in FIG. 3, the predetermined number of sampling points among the second sampling points around sampling point #2 are sampling points #1 point and #3. Assuming that sampling point #i (which has an amplitude $mag_i$) of the second sampling points is determined as a sampling point to be processed, and the two sampling points of the second sampling points around sampling point #i are sampling point #i−1 (which has amplitude $mag_{i-1}$) and sampling point #i+1 (which has an amplitude $mag_{i+1}$). For the three sampling points, i.e., the sampling point #i−1, the sampling point #i and the sampling point #i+1, the predetermined interpolation function can be constructed as, for example, a quadratic function: $f(x)=a_0+a_1 \times x+a_2 \times x^2$, wherein $a_0$, $a_1$ and $a_2$ are coefficients of the predetermined interpolation function and can be determined based on the known three sampling points (i.e., the sampling point #i−1, the sampling point #i and the sampling point #i+1) and the quadratic function, and wherein x represents a position in time domain of the signal and f(x) represents the amplitude of the signal at the position in time domain. Then, the coordinates ($x_{peak}$, $y_{peak}$) of the peak point can be determined based on the quadratic function, for example, by vertex calculation of quadratic function. That is, $x_{peak}=-a_1/2 \times a_2$, $y_{peak}=a_0+a_1 \times x_{peak}+a_2 \times x_{peak2}$. $x_{peak}$ represents the position of the peak point, and $y_{peak}$ represents the amplitude of the peak point. The peak point ($x_{peak}$, $y_{peak}$) is a peak point corresponding to sampling point #i. For example, as shown in (a) of FIG. 3, the coordinates of peak point marked as "P1" corresponding to sampling point #2 and the coordinates of peak point marked as "P2" of corresponding to sampling point #10 can be determined. Considering the determination of the peak point not only considers the amplitudes of the second sampling points but also considers the amplitudes of value points between the second sampling points, the determination of the peak points is performed by interpolation based on the first sampling points. Further, in some embodiments, based on the determined coordinates ($x_{peak}$, $y_{peak}$) of peak points, position displacing of the peak points from the first sampling points can be obtained. For example, assuming that the horizontal coordinate $x_{peak}$ of the peak point "P1" is 2.5, the corresponding first sampling point is sampling point #2 and its horizontal coordinate is 3, then the position displacing of the peak point "P1" from its corresponding first sampling point (sampling point #2) is 0.5. Since the position displacing (for example, 0.5) of the peak point from its corresponding first sampling point is smaller than the distance (for example, 1) between two consecutive sampling points (sampling points #1 and #2) of the second sampling points, it can be simply called a fractional displacing or delay.

According to embodiments of the present application, the amplitudes of value points between the second sampling points can be determined by interpolation, for example with an interpolation function, and are used to determine the peak points. Therefore, the accuracy of peak determination is improved while the processing complexity and burden are not increased. In addition, not only the amplitudes of value points between the second sampling points can be determined, but also the positions in time domain of the peak points can be obtained, for example, position displacing of the peak points from the first sampling points can be obtained by interpolation. The fractional displacing may be used to determine the filters for peak shaping, thus improving the signal quality after peak clipping. In contrast, the conventional CFR usually uses a fixed filter for peak shaping, but it does not determine and use the position displacing of the peak point for peak shaping.

With determining peak points of the signal by the interpolation based on the first sampling points, less processing resources and less processing delay are needed, while keeping high accuracy.

Referring to FIG. 1, according to an embodiment of the present disclosure, instead of determination of peak points by the interpolation, at 110, the peak points of the input signal respectively corresponding to the first sampling points can be determined by sampling the input signal with a second sampling rate to obtain third sampling points of the input signal, determining the peak points by comparing amplitudes of the third sampling points with a second preset threshold and determining the first sampling points according to the determined peak points. The first sampling points are among second sampling points (such as sampling points #0, #1, #2, #3, #4, #5, #6, #7, #8, #9, #10, #11 and #12) of the input signal with the first sampling rate. For example, the first sampling points refer to the sampling points closest to the peak points among the second sampling points. The second sampling rate is N times of the first sampling rate, and N is an integer greater than one. For example, assuming that a number of the second sampling points with the first sampling rate is 3, and N is equal to 10, then a number of the third sampling points with the second sampling rate is 3×N=30.

In an embodiment, the amplitudes of the third sampling points (for example, 30 third sampling points) are compared with the second preset threshold, and the sampling points whose amplitudes are larger than the second preset threshold among the third sampling points can be determined as peak points. The second preset threshold may be the first preset threshold magThres as above-mentioned.

In another embodiment of the present disclosure, only the amplitudes of part of the third sampling points of the input signal can be compared with the second preset threshold. For example, a second search window with a second present length (for example, winLen), which can also be called a peak search window, can be moved along the input signal to determine the peak points. A maximum amplitude (for example, $mag_w$) of the third sampling points within the second search window can determined each time the second search window is moved. Then, the maximum amplitude (for example, $mag_w$) within the second search window can be compared with the second preset threshold such that the second sampling point with the maximum amplitude is determined as one of the peak points in response to the maximum amplitude being greater than the second preset threshold. The second search window can be moved along the input signal until all the third sampling points the input signal are covered.

Then, amplitudes and position of the peak points respectively corresponding to the first sampling points can be determined. For example, position displacing of the peak points from corresponding first sampling points can be obtained. For example, assuming that the $13^{th}$ sampling point among the 30 third sampling points is the peak point, the corresponding first sampling point, i.e., the closest sampling points for the peak point, is the $1^{st}$ sampling point among the 3 second sampling points. Assuming the horizontal coordinates of the 3 second sampling points are 1, 2 and 3, respectively, the horizontal coordinate $x_{peak}$ of the peak point can be determined to be equal to 1.3 by converting 30 second sampling points from the second sampling rate back to the first sampling rate. Thus, the position displacing of the peak point from the corresponding first sampling points (i.e., the $1^{st}$ sampling point among the 3 second sampling point) can be determined as 0.3.

It can be understood that the present disclosure is not limited to determination of the coordinates of the peak point as above-mentioned, other ways (for example, derivation) can also be used to determine the coordinates of the peak points of the input signal.

After the peak points are determined at 110, a peak reduction signal can be generated based on the peak points. For example, in order to generate a peak reduction signal, at 120, a peak reduction value sequence (i.e., $peak_{new}$ sequence) with peak reduction values respectively for the second sampling points of the input signal can be generated based on amplitudes of the peak points determined at 110, and at 130, a peak reduction signal can be generated by performing peak shaping on the peak reduction value sequence based on position displacing of the peak points from the first sampling points determined at 110.

An example process of generating a peak reduction value sequence with peak reduction values respectively for the first sampling points at 120 is described as follows. For example, the peak reduction value sequence (i.e., $peak_{new}$ sequence) can be [$peak_{new0}$, $peak_{new1}$, . . . , $peak_{newn}$], wherein each $peak_{newi}$ is a peak reduction value corresponding to a second sampling point, wherein i=0, 1, . . . , n.

For example, for each first sampling point (e.g., the sampling point #i), a peak reduction value (i.e., $peak_{newi}$) can be obtained according to the following formula (2).

$$peak_{new,i} = clipRatio \cdot (peak - magThres) \cdot e^{j \, phase_i} \qquad (2)$$

wherein $peak_{newi}$ is the peak reduction value for corresponding second sampling point (e.g., the sampling point #i), peak is the amplitude of the peak point corresponding to said first sampling point (e.g., the sampling point #i), clipRatio is a preset scaling factor, phase is a phase value of said each first sampling point, j is an imaginary symbol, and magThres is the preset threshold as above-mentioned. The value of the scaling factor clipRatio can be preset as required, and the larger the value, the greater the degree of the peak clipping. For example, the value of clipRatio can usually be set as 1. For example, in FIG. 3, $peak_{new2}$ is the peak reduction value for sampling point #2, which can be obtained based on peak point "P1" according to the above-mentioned formula (2), and $peak_{new10}$ is the peak reduction value for sampling point #10, which can be obtained based on peak point "P2" according to the above-mentioned formula (2).

For each of the sampling points other than the first sampling points among the second sampling points in the input signal, the peak reduction values can be set as zero. For example, in (b) of FIG. 3, other sampling points except for sampling points #2 and #10, such as sampling points #0, #1, #3, #4, #5, #6, #7, #8, #9, #11 and #12, can be set as zero. By combing the peak reduction values of the first sampling points and the sampling points other than the first sampling points among the second sampling points, the peak reduction value sequence (i.e., $peak_{new}$ sequence) $[peak_{new0}, peak_{new1}, \ldots, peak_{newn}]$ can be obtained as shown in (b) of FIG. 3.

After the peak reduction value sequence is generated at 120, at 130, peak shaping can be performed on the peak reduction value sequence based on position displacing of the peak points from the first sampling points to generate the peak reduction signal. The peak shaping can be performed by a shaping filter, such as a convolution filter. As shown in (b) and (c) of FIG. 3, for each peak reduction value in the peak reduction value sequence, a calculation sequence can be convolved with a filtering sequence to generate a peak reduction signal value corresponding to said each peak reduction value for generating the peak reduction signal $Z=[z_0, z_1, \ldots, z_n]$. The calculation sequence can be composed of said each peak reduction value and a number of peak reduction values before, after or around said each peak reduction value. The filtering sequence refers to a sequence of filter coefficients of the conventional filter.

For example, the peak reduction signal Z can be generated by the following formula (3).

$$z_i = \sum_{k=0}^{M-1} h_i(k) peak_{new}(i-k) \quad (3)$$

wherein $h_i(k)$ is the corresponding filtering sequence, M is length of shaping filter, and i=0, 1, . . . , n. For example, as shown in (b) of FIG. 3, for sampling point #2, $z_2 = \sum_{k=0}^{M-1} h_2(k) peak_{new}(2-k)$. That is, $peak_{new}(2-k)$ can be convolved with $h_2(k)$ to generate $z_2$. $peak_{new}(2-k)$ can be any of $peak_{new,2}$ of sampling point #2 and M−1 peak reduction values before $peak_{new2}$.

For example, the filtering sequence can be determined based on position displacing of the peak points from its corresponding first sampling point to which said each peak reduction value belongs. Taking formula (3) as an example, $h_i(k)$ may vary per sampling point depending on the position displacing of the corresponding peak point from the first sampling point. For example, as shown in (a) and (b) of FIG. 3, $h_2(k)$ can be determined based on position displacing of the peak point "P1" from its corresponding first sampling point #2 to which said peak reduction value $peak_{new2}$ belongs.

Referring to (a) of FIG. 3, assuming that the horizontal coordinate $x_{peak}$ of the peak point "P1" is 2.5, the position displacing of the peak point "P1" from its corresponding first sampling point (sampling point #2) is 0.5. That is, the fractional delay is 0.5. For another example, as above-mentioned, the position displacing of the peak point from corresponding first sampling points (i.e., the $1^{st}$ sampling point among the 3 first sampling point) can be determined as 1.3. That is, the fractional delay is 0.3.

Then, according to an embodiment of the present disclosure, the filtering sequence can be determined based on the fractional delay (for example, 0.5 or 0.3) of the peak point. For example, the filtering sequence $h_i(k)$ may be determined based on the fractional delay of the peak point corresponding to the sampling point #i from the sampling point #i.

In some embodiments, a group of filtering sequences can be prestored in a storage, and the filtering sequence can be selected from the prestored group of filtering sequences based on the fractional delay. Each of the filtering sequences in the group may have an index m. For example, a group of six filtering sequences associated respectively with the fractional delays of [0, 0.1, 0.2, 0.3, 0.4, 0.5] are prestored and the index m can be 0, 1, 2, 3, 4, 5. Then, if a fractional delay at a sampling point is any of the above stored delays, a corresponding filtering sequence with index m will be selected for this sampling point. If a calculated fractional delay at a sampling point is not any of the prestored fractional delays, the calculated fractional delay may be unified to one of the prestored fractional delays. For example, a prestored fractional delay nearest to the calculated fractional delay can be used to select the filtering sequence. In another example, a calculated fractional delay larger than 0.5 may be converted to (1−the calculated fractional delay), and then a prestored fractional delay nearest to the converted fractional delay can be used to select the filtering sequence.

In some other embodiments, instead of storing a group of multiple filtering sequences in advance, only one filtering sequence can be stored and can be adjusted according to the fractional delay to realize another filtering sequence. For example, a filtering sequence for a fractional delay of 0 can be prestored and can be dynamically adjusted to realize a filtering sequence a fractional delay of any other value such as 0.1. In another example, no filter sequence is prestored, and the filtering sequence for a fractional delay can be determined based on a rule or an equation related to the fractional delay.

With the filtering sequence being determined based on the position displacing of the peak point from its corresponding first sampling point, the determined filtering sequence can be associated with accurate position of the peak point, such as to obtain a peak reduction signal closer to the input signal in shape, thereby reducing the damage to OFDM signals caused by peak clipping and improve the EVM (Error Vector Magnitude) quality of signals after peak clipping.

At 140, the peak reduction signal can be subtracted from the input signal. Then, the result of subtraction is output as the output signal Y. In order to make the input signal X aligned with the peak reduction signal Z, the input signal X can be delayed.

According to some embodiments of the present disclosure, the peak reduction signal can be generated with filtering based on position displacing of the peak points from the first sampling points, which can reduce damages to the signal caused by peak clipping. Compared with determining amplitudes and phases of the peak points in the conventional CFR, in some embodiments of the present disclosure, not only the amplitudes of the peak points between the sampling points can be determined, but also position displacing of the peak points from the first sampling points can be obtained. Such position displacing information of the peak points can facilitate improving the signal quality after the peak clipping. In addition, the peak clipping method in embodiments of the present disclosure can use interpolation instead of up-sampling, which can take less hardware resources and reduce processing delay while maintaining high accuracy.

Figure 4:
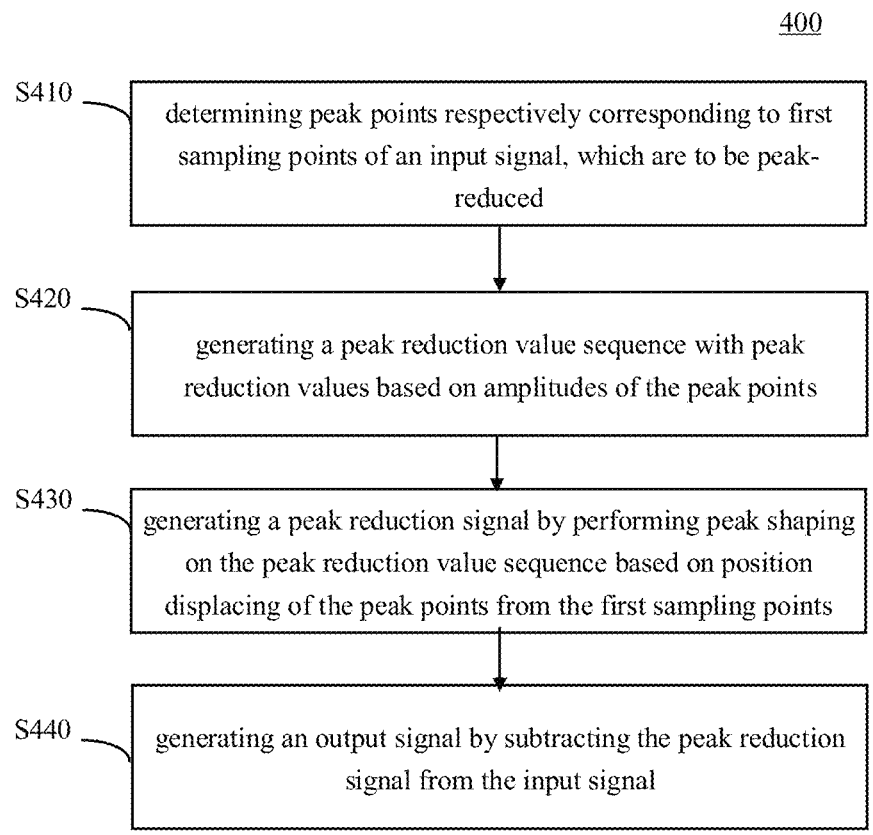
FIG. 4 shows a flowchart of a method for processing signals in wireless communication according to an embodiment of the present disclosure.

FIG. 4 shows a flowchart of a method 400 for processing signals in wireless communication according to an embodiment of the present disclosure.

At Step 410, peak points respectively corresponding to first sampling points of the input signal $X=[x_0, x_1, \ldots, x_n]$, which are to be peak-reduced, can be determined. The first sampling points may be sampling points related to (for example, closest to) the peak point among the second sampling points of the input signal.

According to an embodiment of the present disclosure, the peak points (for example, points marked as "P1" or "P2" as shown in (a) of FIG. 3) of the input signal respectively corresponding to the first sampling points (such as sampling points #2 and #10 as shown in (a) of FIG. 3) can be determined by interpolation based on the first sampling points. An example with the interpolation will be described in detail below.

At Step 410, the input signal can be sampled with a first sampling rate to obtain second sampling points of the input signal, and the first sampling points can be determined from the second sampling points by comparing amplitudes of the second sampling points with a first preset threshold.

In an embodiment, the sampling points whose amplitudes are larger than the first preset threshold can be determined as the first sampling points. As shown in (a) of FIG. 3, the sampling points with the maximum amplitudes larger than the preset threshold magThres among the second sampling points can be determined as the first sampling points, such as sampling points #2 and #10.

In another embodiment of the present disclosure, only the amplitudes of part of the second sampling points of the input signal can be compared with the first preset threshold magThres. For example, a search window with a first present length winLen can be moved along the input signal to determine the first sampling points. A maximum amplitude (for example, $mag_w$) of the second sampling points within the first search window can determined each time the first search window is moved. Then, the maximum amplitude (for example, $mag_w$) within the first search window can be compared with the threshold magThres, such that the sampling point with the maximum amplitude among the second sampling points is determined as one of the first sampling points in response to the maximum amplitude being greater than the first preset threshold. Then, at Step 410, peak points (for example, points marked as "P1" or "P2" as shown in (a) of FIG. 3) of the input signal respectively corresponding to the first sampling points (such as sampling points #2 and #10 as shown in (a) of FIG. 3) can be determined by interpolation based on the first sampling points. The interpolation can use various interpolation methods, such as Lagrange interpolation function, linear interpolation, nonlinear interpolation or Newton interpolation. In order to determine peak points of the input signal, at Step 410, for each of the first sampling points to be processed, an amplitude distribution can be determined based on a predetermined interpolation function and amplitudes of said each of the first sampling point and a predetermined number of sampling points among the second sampling points around said each of the first sampling points. The predetermined interpolation function can be, for example, a quadratic function. Then, an amplitude and a position of a peak point for each of the first sampling points can be determined according to the amplitude distribution. For example, the amplitudes and positions of the peak points can be represented by coordinates of the peak points. The horizontal coordinates can represent positions of the peak points and the vertical coordinates can represent amplitudes of the peak points.

According to an embodiment of the present disclosure, instead of determination of peak points with the interpolation, at Step 410, the peak points of the input signal respectively corresponding to the first sampling points can be determined by sampling the input signal with a second sampling rate to obtain third sampling points of the input signal, determining the peak points by comparing amplitudes of the third sampling points with a second preset threshold and determining the first sampling points according to the determined peak points. For example, the first sampling points refer to the sampling points closest to the peak points among the second sampling points. The second sampling rate is N times of the first sampling rate, and N is an integer greater than one.

In an embodiment, the amplitudes of the third sampling points (for example, 30 third sampling points) are compared with the second preset threshold, and the sampling points whose amplitudes are larger than the second preset threshold among the third sampling points can be determined as peak points. The second preset threshold may be the first preset threshold magThres as above-mentioned.

In another embodiment of the present disclosure, only the amplitudes of part of the third sampling points of the input signal can be compared with the second preset threshold. For example, a second search window with a second present length winLen can be moved along the input signal to determine the peak points. A maximum amplitude (for example, $mag_w$) of the third sampling points within the second search window can determined each time the second search window is moved. Then, the maximum amplitude (for example, $mag_w$) within the second search window can be compared with the second preset threshold, such that the second sampling point with the maximum amplitude is determined as one of the peak points in response to the maximum amplitude being greater than the second preset threshold.

Then, amplitudes and position of the peak points respectively corresponding to the first sampling points can be determined. For example, position displacing of the peak points from corresponding first sampling points can be obtained.

Step S410 is similar to the above-mentioned process 110, and will not be described in detail here for brevity.

At Step 420, a peak reduction value sequence (i.e., $peak_{new}$ sequence) with peak reduction values respectively for the second sampling points can be generated based on amplitudes of the peak points. For example, for each of the first sampling points, a peak reduction value can be obtained according to the following formula (4).

$$peak_{new}=clipRatio\cdot(peak-magThres)\cdot e^{j\,phase} \quad (4)$$

wherein $peak_{new}$ is the peak reduction value for said each of the first sampling points, peak is the amplitude of the peak point corresponding to said each of the first sampling points, clipRatio is a preset scaling factor, phase is a phase value of said each of the first sampling points, and magThres is the preset threshold.

For example, the peak reduction value sequence (i.e., $peak_{new}$ sequence) can be $[peak_{new0}, peak_{new1}, \ldots, peak_{newn}]$, wherein each $peak_{newi}$ is a peak reduction value corresponding to a second sampling point, wherein i=0, 1, ..., n. For sampling point #i, a peak reduction value (i.e., $peak_{newi}$) can be obtained. For each of the sampling points other than the first sampling points among the second sampling points in the input signal, the peak reduction values can be set as zero. For example, in (b) of FIG. 3, other sampling points except for sampling points #2 and #10 points, such as sampling points #0, #1, #3, #4, #5, #6, #7, #8, #9, #11 and #12, can be set as zero. By combing the peak reduction values of the first sampling points and the sampling points other than the first sampling points among the second sampling points, the peak reduction value sequence (i.e., $peak_{new}$ sequence) $[peak_{new0}, peak_{new1}, \ldots, peak_{newn}]$ can be obtained as shown in (b) of FIG. 3.

Step S420 is similar to the above-mentioned process 120, and will not be described in detail here for brevity.

At Step 430, the peak reduction signal can be generated by performing peak shaping on the peak reduction value sequence based on position displacing of the peak points from the first sampling points after the peak reduction value sequence is generated. For each peak reduction value in the peak reduction value sequence, a calculation sequence can be convolved with a filtering sequence to generate a peak reduction signal value corresponding to said each peak reduction value for generating the peak reduction signal Z. The calculation sequence can be composed of said each peak reduction value and a number of peak reduction values before, after or around said each peak reduction value. The filtering sequence refers to a sequence of filter coefficients of the conventional filter. For example, the peak reduction signal Z can be generated according to the above-mentioned formula (3).

For example, the filtering sequence (for example, $h_r(k)$) can be determined based on position displacing of the peak points from its corresponding first sampling point to which said each peak reduction value belongs.

In one embodiment, a group of filtering sequences can be prestored in storage of hardware and the filtering sequence can be selected from the prestored group of filtering sequences based on the fractional delay. Each of filtering sequences in the group may have an index j. For example, a prestored fractional delay nearest to the calculated fractional delay can be used to select the filtering sequence. In another example, a calculated fractional delay larger than 0.5 may be converted to (1−the calculated fractional delay), and then a prestored fractional delay nearest to the converted fractional delay can be used to select the filtering sequence.

In another embodiment, instead of storing a group of six filtering sequences in advance, only one filtering sequence can be stored and can be adjusted according to the fractional delay to realize another filtering sequence. For example, a filtering sequence for a fractional delay of 0 can be prestored and can be dynamically adjusted to realize a filtering sequence a fractional delay of any other value such as 0.1. In another example, no filter sequence is prestored, and the filtering sequence for a fractional delay can be determined based on a rule or an equation related to the fractional delay.

Step S430 is similar to the above-mentioned process 130, and will not be described in detail here for brevity.

At Step 440, an output signal can be generated by subtracting the peak reduction signal from the input signal. In order to ensure that the input signal X is aligned with the peak reduction signal Z, the input signal X can be delayed. Step S440 is similar to the above-mentioned process 140, and will not be described in detail here for brevity.

Figure 5:
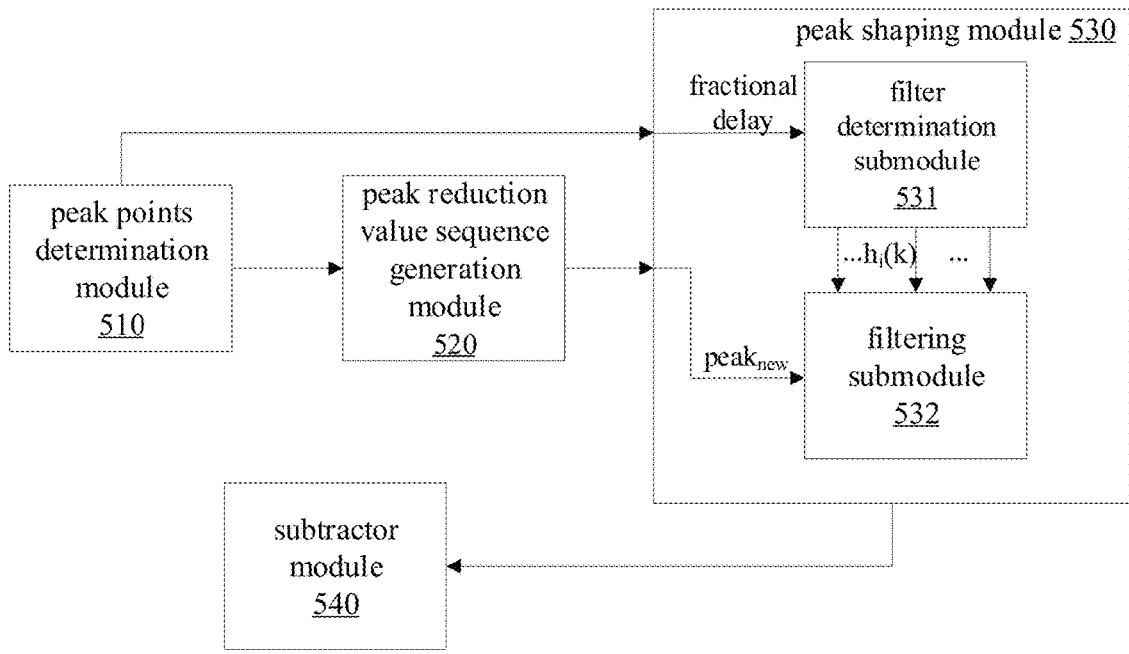
FIG. 5 shows an exemplary block diagram of an apparatus for processing signals in wireless communication according to an embodiment of the present disclosure.

FIG. 5 shows an exemplary block diagram of an apparatus for processing signals in wireless communication according to an embodiment of the present disclosure. The details described in the above with respect to the methods as shown in FIG. 4 are also applied hereto.

As shown in FIG. 5, the apparatus 500 for processing signals in wireless communication can comprise a peak points determination module 510, a peak reduction value sequence generation module 520, a peak shaping module 530, and a subtractor module 540.

The peak points determination module 510 can be used to determine peak points respectively corresponding to first sampling points of the input signal $X=[x_0, x_1, \ldots, x_n]$, which are to be peak-reduced. The first sampling points may be sampling points related to (for example, closest to) the peak point among the second sampling points.

According to an embodiment of the present disclosure, the peak points determination module 510 can be used to determine the peak points (for example, points marked as "P1" or "P2" as shown in (a) of FIG. 3) of the input signal respectively corresponding to the first sampling points (such as sampling points #2 and #10 as shown in (a) of FIG. 3) by interpolation based on the first sampling points.

Figure 6:
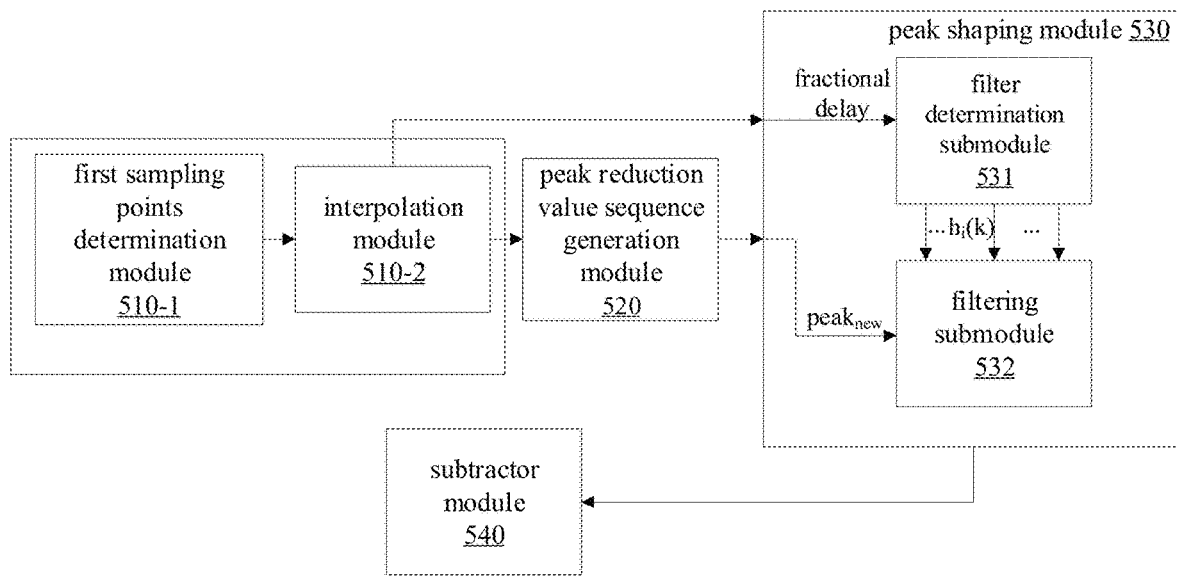
FIG. 6 shows another exemplary block diagram of an apparatus for processing signals in wireless communication according to an embodiment of the present disclosure.

For example, the peak points determination module 510 may include a first sampling points determination module 510-1 and an interpolation module 510-2 as shown in FIG. 6. The first sampling points determination module 510-1 can be used to sample the input signal with a first sampling rate to obtain second sampling points of the input signal and determine the first sampling points from the second sampling points by comparing amplitudes of the second sampling points with a first preset threshold.

In an embodiment, the first sampling points determination module 510-1 can be used to determine the sampling points with the maximum amplitudes larger than the preset threshold magThres as the first sampling points, such as sampling points #2 and #10 as shown in (a) of FIG. 3. In another embodiment of the present disclosure, the first sampling points determination module 510-1 can be used to determine a maximum amplitude (for example, $mag_w$) of the sampling points within the search window as one of the first sampling points in response to the maximum amplitude being greater than the preset threshold. The first sampling points determination module 510-2 can be used to perform process 110-1 in FIG. 2, and will not be described in detail here for brevity.

The interpolation module 510-2 can be used to determine the peak points (for example, points marked as "P1" or "P2" as shown in (a) of FIG. 3) of the input signal respectively corresponding to the first sampling points (such as sampling points #2 and #10 as shown in (a) of FIG. 3) by interpolation based on the first sampling points. The interpolation can use various interpolation methods, such as Lagrange interpolation function, linear interpolation, nonlinear interpolation or Newton interpolation. In order to determine peak points of the input signal, for each of the first sampling points to be processed, the interpolation module 510-2 can be used to determine an amplitude distribution based on a predetermined interpolation function and amplitudes of said each of the first sampling point and a predetermined number of sampling points among the second sampling points around said each of the first sampling points. The predetermined interpolation function can be, for example, a quadratic function. Then, the interpolation module 510-2 can be used to determine an amplitude and a position of a peak point for each of the first sampling points according to the amplitude distribution. For example, the amplitudes and positions of the peak points can be represented by coordinates of the peak points. The horizontal coordinates can represent positions of the peak points and the vertical coordinates can represent amplitudes of the peak points. The interpolation module 510-2 can be used to perform process 110-2 in FIG. 2, and will not be described in detail here for brevity.

Referring to FIG. 5, according to an embodiment of the present disclosure, instead of determination of peak points by the interpolation, the peak points determination module 510 can be used to determine the peak points of the input signal respectively corresponding to the first sampling points by sampling the input signal with a second sampling rate to obtain third sampling points of the input signal, determining the peak points by comparing amplitudes of the third sampling points with a second preset threshold and determining the first sampling points according to the determined peak points. For example, the first sampling points refer to the sampling points closest to the peak points among the second sampling points. The second sampling rate is N times of the first sampling rate, and N is an integer greater than one.

In an embodiment, the peak points determination module 510 can be used to determine the sampling points whose amplitudes are larger than the second preset threshold among the third sampling points as peak points. The second preset threshold may be the first preset threshold magThres as above-mentioned.

In another embodiment of the present disclosure, only the amplitudes of part of the third sampling points of the input signal can be compared with the second preset threshold. For example, a second search window with a second present length winLen can be moved along the input signal to determine the peak points. The peak points determination module 510 can be used to determine a maximum amplitude (for example, $mag_w$) of the third sampling points within the second search window each time the second search window is moved. Then, the peak points determination module 510 can be used to determine one of the third sampling points with the maximum amplitude as one of the peak points in response to the maximum amplitude being greater than the second preset threshold.

The peak points determination module 510 can be used to perform operations of Step S410 in FIG. 4, and will not be described in detail here for brevity.

After the peak points are determined, a peak reduction signal can be generated based on the peak points. For example, in order to generate a peak reduction signal, the peak reduction value sequence generation module 520 can be used to generate a peak reduction value sequence (i.e., $peak_{new}$ sequence) with peak reduction values respectively for the second sampling points of the input signal based on amplitudes of the peak points, and the peak shaping module 530 can be used to generate the peak reduction signal by performing peak shaping on the peak reduction value sequence based on position displacing of the peak points from the first sampling points after the peak reduction value sequence is generated.

For each peak reduction value in the peak reduction value sequence, the peak shaping module 530 can be used to convolve a calculation sequence with a filtering sequence to generate a peak reduction signal value corresponding to said each peak reduction value for generating the peak reduction signal Z. The calculation sequence can be composed of said each peak reduction value and a number of peak reduction values before, after or around said each peak reduction value. The filtering sequence refers to a sequence of filter coefficients of the conventional filter. For example, the peak reduction signal Z can be generated according to the above-mentioned formula (3).

As shown in FIGS. 5-6, position displacing (for example, the fractional delay) of the peak points from its corresponding first sampling point determined by the peak points determination module 510 are provided to the peak shaping module 530, and the peak reduction value sequence (i.e., $peak_{new}$ sequence) determined by the peak reduction value sequence generation module 520 is provided to the peak shaping module 530. For example, the peak shaping module 530 can be used to determine the filtering sequence (for example, $h_i(k)$) based on position displacing (i.e., the fractional delay) of the peak points from its corresponding first sampling point to which said each peak reduction value belongs. The peak reduction value sequence generation module 520 can be used to perform operations of Step S420 in FIG. 4 and the peak shaping module 530 can be used to perform operations of Step S430 in FIG. 4, and will not be described in detail here for brevity.

In one embodiment, the peak shaping module 530 can include a filter determination submodule 531 and a filtering submodule 532.

The filter determination submodule 531 can be used to determine the filtering sequence based on the fractional delay (for example, 0.5 or 0.3) of the peak point output from the peak points determination module 510. In one embodiment, a group of filtering sequences can be prestored in storage of hardware, and the filter determination submodule 531 can be used to select filtering sequence from the prestored group of filtering sequences based on the fractional delay. In another embodiment, instead of storing a group of filtering sequences in advance, only one filtering sequence can be stored, and the filter determination submodule 531 can be used to adjust filtering sequence to realize any filtering sequence.

The filtering submodule 532 can be used to perform peak shaping on the peak reduction value sequence from the peak reduction value sequence generation module 520 based on the filtering sequence determined in the filter coefficients determination submodule 531 to generating a peak reduction signal Z for outputting. For example, for each peak reduction value in the peak reduction value sequence, the filtering submodule 532 can be used to convolve a calculation sequence with a filtering sequence to generate a peak reduction signal value corresponding to said each peak reduction value for generating the peak reduction signal.

The subtractor module 540 can be used to subtract the peak reduction signal from the input signal. In order to make the input signal X aligned with the peak reduction signal Z, the input signal X can be delayed. The subtractor module 540 can be used to perform operations of Step S440 in FIG. 4, and will not be described in detail here for brevity.

Figure 7:
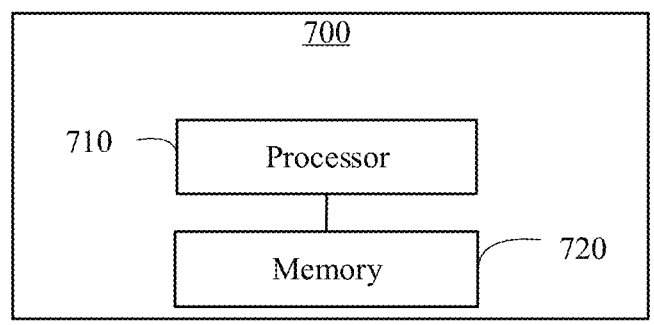
FIG. 7 shows an exemplary block diagram of an apparatus for processing signals in wireless communication according to an embodiment of the present disclosure.

FIG. 7 shows an exemplary block diagram of an apparatus for processing signals in wireless communication according to an embodiment of the present disclosure.

As shown in FIG. 7, the apparatus 700 for processing signals in wireless communication can comprise one or more processors 710 and memory 720. The processor 710 is communicatively coupled with the memory 720 and configured to perform the methods described above.

A set of computer program instructions stored in the memory, which, when executed by at least one of the processors, perform actions of any step of the methods described above, including: determining first sampling points to be processed in an input signal based on amplitudes of sampling points of the input signal and a preset threshold; determining peak points of the input signal respectively corresponding to the first sampling points by interpolation based on the first sampling points; generating a peak reduction signal based on the peak points; and generating an output signal by subtracting the peak reduction signal from the input signal. The details described in the above with respect to the methods as shown in FIG. 3 are also applied hereto.

Examples of the processor 710 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 710 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 720.

The memory 720 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 720 may reside in the processor 710, external to the processor 710, or distributed across multiple entities including the processor 710. The memory 720 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a computer program product for processing signals in wireless communication is disclosed. As an example, the computer program product comprises a non-transitory computer readable storage medium having program instructions embodied therewith, and the program instructions are executable by a processor. When executed, the program instructions cause the processor to perform one or more of the above described procedures, and details are omitted herein for conciseness.

The present disclosure may be a system, a method, and/or a computer program product at any possible technical detail level of integration. The computer program product can comprise a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions can be used in the disclosure as a convenient method for distinguishing two or more units. Thus, a reference to a first unit and a second unit does not imply that only two units can be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims "including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for processing signals in wireless communication, comprising:
    determining peak points respectively corresponding to first sampling points of an input signal, which are to be peak-reduced;
    generating a peak reduction value sequence with peak reduction values based on amplitudes of the peak points;
    generating a peak reduction signal by performing peak shaping on the peak reduction value sequence based on position displacing of the peak points from the first sampling points; and
    generating an output signal by subtracting the peak reduction signal from the input signal.

2. The method according to claim 1, wherein generating a peak reduction value sequence with peak reduction values based on amplitudes of the peak points comprises:
    for each of the first sampling points, obtaining a peak reduction value according to the following formula:

$$peak_{new} = clipRatio \cdot (peak - magThres) \cdot e^{j\,phase}$$

wherein $peak_{new}$ is the peak reduction value for said each of the first sampling points, peak is the amplitude of the peak point corresponding to said each of the first sampling points, clipRatio is a preset scaling factor, phase is a phase value of said each of the first sampling points, and magThres is a preset threshold; and
    for each of sampling points of the input signal other than the first sampling points among second sampling points with a first sampling rate, setting a peak reduction value with zero, wherein the first sampling points are among the second sampling points.

3. The method according to claim 2, wherein generating a peak reduction signal by performing peak shaping on the peak reduction value sequence based on position displacing of the peak points from the first sampling points comprises:
for each peak reduction value in the peak reduction value sequence, convolving a calculation sequence composed of said each peak reduction value and a number of peak reduction values before, after or around said each peak reduction value with a filtering sequence to generate a peak reduction signal value corresponding to said each peak reduction value,
wherein the filtering sequence is determined based on the position displacing of the peak point from its corresponding first sampling point to which said each peak reduction value belongs.

4. The method according to claim 3, wherein the filtering sequence is selected from a prestored group of filtering sequences based on the position displacing of the peak point from its corresponding first sampling point to which said each peak reduction value belongs.

5. The method according to claim 1, further comprising:
sampling the input signal with a first sampling rate to obtain second sampling points of the input signal; and
determining the first sampling points from the second sampling points by comparing amplitudes of the second sampling points with a first preset threshold.

6. The method according to claim 5, wherein determining peak points respectively corresponding to first sampling points of the input signal comprises:
determining, for each of the first sampling points, an amplitude distribution by interpolation based on a predetermined interpolation function and amplitudes of said each of the first sampling point and a predetermined number of sampling points around said each of the first sampling point; and
determining, for each of the first sampling points, an amplitude and a position of a corresponding peak point according to the amplitude distribution.

7. The method according to claim 6, wherein the predetermined interpolation function is a quadratic function.

8. The method according to claim 6, wherein the interpolation is Lagrange interpolation, linear interpolation, non-linear interpolation or Newton interpolation.

9. The method according to claim 5, wherein determining the first sampling points of the input signal comprises:
determining a maximum amplitude of the input signal within a first search window having a first preset window length; and
determining the sampling point with the maximum amplitude as one of the first sampling points in response to the maximum amplitude being greater than the preset threshold.

10. The method according to claim 1, wherein determining the peak points respectively corresponding to the first sampling points comprises:
sampling the input signal with a second sampling rate to obtain third sampling points of the input signal;
determining the peak points by comparing amplitudes of the third sampling points with a second preset threshold;
determining the first sampling points according to the determined peak points, wherein the first sampling points are among second sampling points of the input signal with a first sampling rate, the second sampling rate is N times of the first sampling rate, and N is an integer greater than one.

11. The method according to claim 10, wherein determining the peak points by comparing amplitudes of the third sampling points with a second preset threshold comprises:
determining a maximum amplitude of the third sampling points within a second search window having a second preset window length; and
determining one of the third sampling points with the maximum amplitude as one of the peak points in response to the maximum amplitude being greater than the second preset threshold.

12. The apparatus according to claim 1, the set of computer program instructions, when executed by the at least one of the processors, further perform actions of:
sampling the input signal with a first sampling rate to obtain second sampling points of the input signal; and
determining the first sampling points from the second sampling points by comparing amplitudes of the second sampling points with a first preset threshold.

13. The apparatus according to claim 12, wherein determining peak points respectively corresponding to first sampling points of the input signal comprises:
determining, for each of the first sampling points, an amplitude distribution by interpolation based on a predetermined interpolation function and amplitudes of said each of the first sampling point and a predetermined number of sampling points around said each of the first sampling point; and
determining, for each of the first sampling points, an amplitude and a position of a corresponding peak point according to the amplitude distribution.

14. An apparatus for processing signals in wireless communication, comprising:
one or more processors;
a memory coupled to at least one of the processors; and
a set of computer program instructions stored in the memory, which, when executed by at least one of the processors, perform actions of:
determining peak points respectively corresponding to first sampling points of an input signal, which are to be peak-reduced;
generating a peak reduction value sequence with peak reduction values based on amplitudes of the peak points;
generating a peak reduction signal by performing peak shaping on the peak reduction value sequence based on position displacing of the peak points from the first sampling points; and
generating an output signal by subtracting the peak reduction signal from the input signal.

15. The apparatus according to claim 14, wherein generating a peak reduction value sequence with peak reduction values based on amplitudes of the peak points comprises:
for each of the first sampling points, obtaining a peak reduction value according to the following formula:

$$\text{peak}_{new} = \text{clipRatio} \cdot (\text{peak} - \text{magThres}) \cdot e^{j\,phase}$$

wherein $\text{peak}_{new}$ is the peak reduction value for said each of the first sampling points, peak is the amplitude of the peak point corresponding to said each of the first sampling points, clipRatio is a preset scaling factor, phase is a phase value of said each of the first sampling points, and magThres is a preset threshold; and
for each of sampling points of the input signal other than the first sampling points among second sampling points with a first sampling rate, setting a peak reduction value with zero, wherein the first sampling points are among the second sampling points.

16. The apparatus according to claim 15, wherein generating a peak reduction signal by performing peak shaping on the peak reduction value sequence based on position displacing of the peak points from the first sampling points comprises:
for each peak reduction value in the peak reduction value sequence, convolving a calculation sequence composed of said each peak reduction value and a number of peak reduction values before, after or around said each peak reduction value with a filtering sequence to generate a peak reduction signal value corresponding to said each peak reduction value,
wherein the filtering sequence is determined based on the position displacing of the peak point from its corresponding first sampling point to which said each peak reduction value belongs.

17. The apparatus according to claim 16, wherein the filtering sequence is selected from a prestored group of filtering sequences based on the position displacing of the peak point from its corresponding first sampling point to which said each peak reduction value belongs.

18. The apparatus according to claim 14, wherein determining the peak points respectively corresponding to the first sampling points comprises:
sampling the input signal with a second sampling rate to obtain third sampling points of the input signal;
determining the peak points by comparing amplitudes of the third sampling points with a second preset threshold;
determining the first sampling points according to the determined peak points, wherein the first sampling points are among second sampling points of the input signal with a first sampling rate, the second sampling rate is N times of the first sampling rate, and N is an integer greater than one.

19. The apparatus according to claim 18, wherein determining the peak points by comparing amplitudes of the third sampling points with a second preset threshold comprises:
determining a maximum amplitude of the third sampling points within a second search window having a second preset window length; and
determining one of the third sampling points with the maximum amplitude as one of the peak points in response to the maximum amplitude being greater than the second preset threshold.

20. A non-transitory computer-readable storage medium storing instructions that cause a processor to:
determine peak points respectively corresponding to first sampling points of an input signal, which are to be peak-reduced;
generate a peak reduction value sequence with peak reduction values based on amplitudes of the peak points;
generate a peak reduction signal by performing peak shaping on the peak reduction value sequence based on position displacing of the peak points from the first sampling points; and
generate an output signal by subtracting the peak reduction signal from the input signal.

\* \* \* \* \*